United States Patent [19]
Harazoe et al.

[11] Patent Number: 5,519,112
[45] Date of Patent: May 21, 1996

[54] METHOD OF MANUFACTURING POLYESTERS

[75] Inventors: Hirofumi Harazoe; Masamitsu Matsuno; Seiji Noda, all of Kuga, Japan

[73] Assignee: Mitsui Petrochemical Industries Ltd., Tokyo, Japan

[21] Appl. No.: 360,601

[22] Filed: Dec. 21, 1994

[30] Foreign Application Priority Data

Dec. 22, 1993 [JP] Japan ................................. 5-325190
Oct. 17, 1994 [JP] Japan ................................. 6-251069

[51] Int. Cl.$^6$ ..................................................... C08F 6/00
[52] U.S. Cl. ........................ 528/481; 528/272; 528/275; 528/280; 528/481; 528/490; 528/501; 528/502; 528/503; 210/767
[58] Field of Search ................................. 528/272, 275, 528/280, 481, 490, 501, 502, 503; 210/767

[56] References Cited

U.S. PATENT DOCUMENTS

| | | | |
|---|---|---|---|
| 3,257,335 | 6/1966 | Whitfield, Jr. et al. | 521/48.5 |
| 3,703,488 | 11/1972 | Morton | 521/48.5 |
| 3,884,850 | 5/1975 | Ostrowski | 521/48.5 |
| 4,226,973 | 10/1980 | Malo et al. | 528/481 |
| 4,263,425 | 4/1981 | Rothe et al. | 528/309 |
| 4,620,032 | 10/1986 | Doerr | 562/483 |

*Primary Examiner*—Samuel A. Acquah
*Attorney, Agent, or Firm*—Birch, Stewart, Kolasch & Birch

[57] ABSTRACT

The invention provides a method of manufacturing polyesters which comprises an esterifying step wherein a dicarboxylic acid and a dihydroxyl compound are esterified and the next liquid phase polycondensation step wherein the resulting ester is subjected to liquid phase polycondensation in the presence of a polycondensation catalyst while a distillate which contains an reacted dihydroxyl compound and the polycondensation catalyst is distilled, wherein the distillate is subjected to a purification treatment comprising:

(a) a distilling step;
(b) a filtering step; and
(c) a decoloring step and then the thus purified distillate is recovered and supplied to the esterifying step. A further method comprises a purification treatment comprising:

(a) a distilling step;
(b) a depolymerizing step; and
(c) a decoloring step.

19 Claims, 3 Drawing Sheets

METHOD OF MANUFACTURING POLYESTERS

FIELD OF THE INVENTION

The present invention relates to a method of manufacturing polyesters and, more particularly, it relates to a method of manufacturing polyesters by the polycondensation of a dicarboxylic acid with a dihydroxyl compound in the presence of a polycondensation catalyst where in the unreacted dihydroxyl compound is recovered together with the catalyst as a distillate and these materials are purified and are then practically recycled in the polycondensation reaction which makes the manufacturing of the polyesters economical.

DESCRIPTION OF PRIOR ART

Polyester resins such as polyethylene terephthalate have been widely used for the molding of packaging containers such as bottles and also in fibers, films or sheets.

Usually, such polyester resins are manufactured via a step in which a dicarboxylic acid and a dihydroxyl compound are subjected to esterification and another step in which the esterified product prepared as such (i.e. a lower level condensate) is subjected to polycondensation in the liquid phase in the presence of a polycondensation catalyst. The thus produced polyester is formed into chips and, usually, they are further subjected to polycondensation in the solid phase to increase the intrinsic viscosity whereupon the product is made available for actual use.

In such a method of manufacturing the polyester resin, the above polycondensation step in the liquid phase is conducted together with the evaporation of the distillate which is produced in said polycondensation. The distillate mostly comprises an unreacted dihydroxyl compound such as ethylene glycol. In addition, 60–70% of the polycondensation catalyst used in the above-mentioned polycondensation in the liquid phase is distilled together with the dihydroxyl compound and is contained in the distillate as well.

Investigations have already been conducted to check the possibility of the effective utilization of the dihydroxyl compound and the catalyst for the polycondensation in which the dihydroxyl compound which is distilled out from the liquid phase polycondensation and the polycondensation catalyst are recycled in the polycondensation.

However, the distillate which is distilled out from the liquid phase polycondensation contains large amounts of impurities such as water, aldehydes and iron due to rust in addition to the dihydroxyl compound and the polycondensation catalyst. Accordingly, when such a distillate is recycled as it is in the polycondensation reaction, the quality of the resulting polyesters deteriorates. Consequently, it has been nearly impossible to directly reutilize the dihydroxyl compound and the polycondensation catalyst recovered as a distillate from the liquid phase polycondensation step for the manufacture of the polyesters.

In order to make such reutilization possible, it has been proposed, for example, in Japanese Patent Publication Laid-Open No. 57-26632 that, as shown in FIG. 1, a germanium catalyst from such a liquid-phase polycondensation step and a distillate containing ethylene glycol are decolored with a cationic exchange resin and then they are reutilized in the step for the manufacturing of the polyester resin. However, it is not possible to fully remove the impurities from the distillate according to such a proposal.

BRIEF SUMMARY OF THE INVENTION

Accordingly, it is an object of the invention to provide a method of manufacturing polyesters in an industrially advantageous manner in which the impurities are effectively removed from a dihydroxyl compound containing the polycondensation catalyst which had been distilled in the liquid phase polycondensation step and purified and the dihydroxyl compound and the polycondensation catalyst recovered as such are effectively reutilized in the liquid-phase polycondensation without the deterioration of the resulting polyester whereby the production cost of the polyester can be reduced.

The invention provides a method of manufacturing a polyester comprising an esterifying step wherein a dicarboxylic acid and a dihydroxyl compound are esterified and the next polycondensation step wherein the resulting ester is subjected to polycondensation reaction in the presence of a polycondensation catalyst while a distillate containing an unreacted dihydroxyl compound and the polycondensation catalyst are distilled, characterized in that, the distillate is subjected to purification treatment comprising:

(a) a distilling step;

(b) a filtering step; and (c) a decoloring step and then the purified substances from the distillate containing the dihydroxyl compound and the polycondensation catalyst are recovered and are supplied to the esterifying step.

As mentioned hereinunder, this method may be referred to as the first method of the invention.

According to the present invention, it is preferred that, in addition to the above mentioned steps (a), (b) and (c), the purification treatment comprising another step (d) for removing iron substances from the distillate (i.e. an iron removing step) is carried out in the first method.

The invention further provides a method of manufacturing a polyester comprising an esterifying step wherein a dicarboxylic acid and a dihydroxyl compound are esterified and the next polycondensation step wherein the resulting ester is subjected to a polycondensation reaction in the presence of a polycondensation catalyst while a distillate containing an unreacted dihydroxyl compound and the polycondensation catalyst are distilled, characterized in that, the distillate is subjected to purification treatment comprising:

(a) a distilling step;

(b) a depolymerizing step; and (c) a decoloring step and the purified substances from the distillate containing the dihydroxyl compound and the polycondensation catalyst are recovered and are supplied to the esterifying step.

As mentioned hereinunder, this method may be referred to as the second method of the invention.

According to the present invention, it is preferred that, in addition to the above-mentioned steps (a), (b) and (c), the purifying treatment comprising another step (d) for removing iron from the distillate (i.e. an iron removing step) and also a filtering step (e) after the above depolymerizing step (b) are carried out in this second method.

Still further, in accordance with the invention, it is preferred in any of the above-mentioned first and second methods that, in supplying the purified substances recovered from the distillate to the esterifying step, a suitable amount of the polycondensation catalyst is newly added to the purified substance from the distillate to adjust the amount of the polycondensation catalyst and is reutilized by supplying it to the esterifying step.

DETAILED DESCRIPTION OF THE INVENTION

Figure 1:
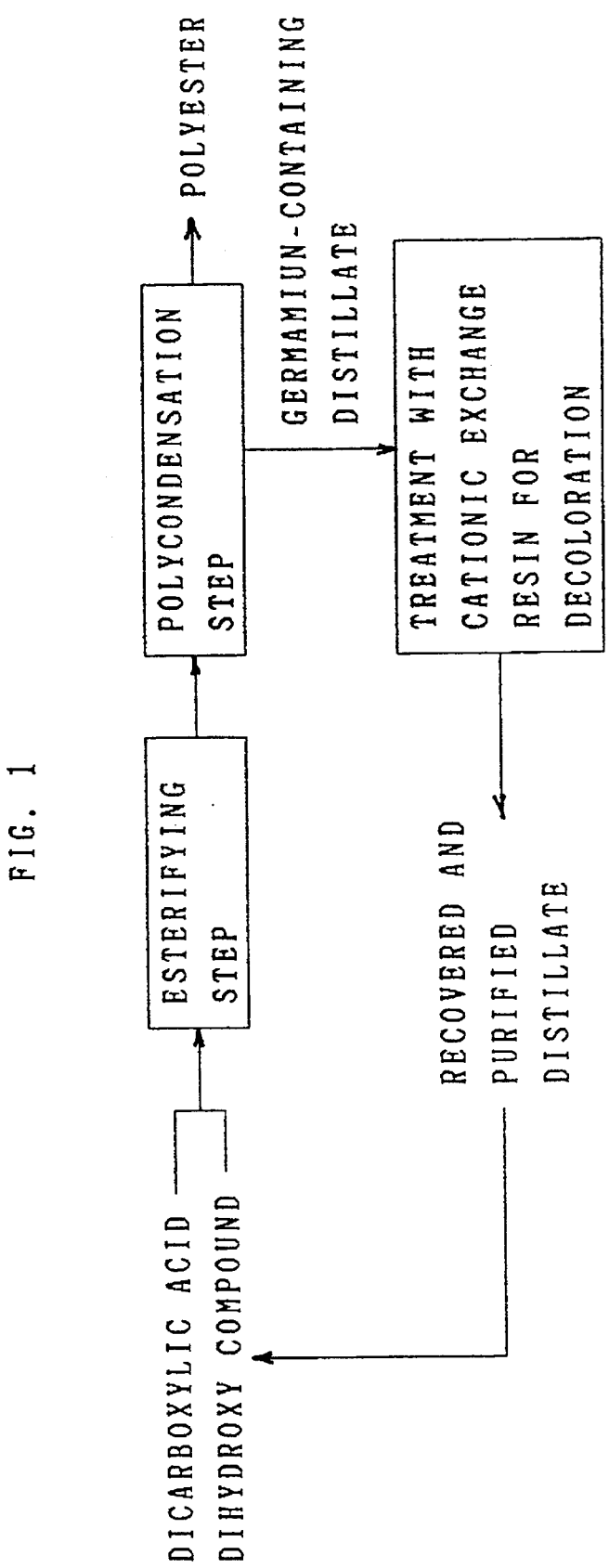
FIG. 1 is a flow sheet showing the purification and the reutilization of the distillate which is distilled from a liquid phase polycondensation step which is one of the steps for the manufacture of polyesters in the prior art.

Below, first a detailed description of the manufacture of polyesters will be given, followed by a description of the purification of the distillate from the polycondensation step and the reutilization thereof.

In the manufacture of the polyester in accordance with the present invention, the above-mentioned esterifying step per se has been known already in which a dicarboxylic acid is reacted with a dihydroxyl compound to form an ester product.

The ester product produced in the esterifying step is then subjected to liquid phase polycondensation in the presence of a polycondensation catalyst together with a process in which a distillate mainly comprising an unreacted dihydroxy compound and the catalyst is ditilled, and such a distillate from the liquid phase polycondensation step is purified and reused in the esterifying step, as the purified distillate is mainly composed of the recovered dihydroxy compound such as ethylene glycol and a small amount of water and the catalyst.

As mentioned later, the dihydroxyl compound which is recovered as a distillate together with the polycondensation catalyst from the liquid phase polycondensation step is purified and is supplied to and reused in the esterifying step according to the invention. The purified distillate is usually supplied to an apparatus for the esterifying reaction continuously in the form of a slurry together with fresh materials, i.e. a dicarboxylic acid and a dihydroxyl compound.

Examples of the above-mentioned dicarboxylic acid are aromatic dicarboxylic acids such as terephthalic acid, phthalic acid, isophthalic acid, naphthalenedicarboxylic acid, diphenyldicarboxylic acid and diphenoxyethanedicarboxylic acid; aliphatic dicarboxylic acids such as adipic acid, azelaic acid, sebacic acid and decanedicarboxylic acid; and alicyclic dicarboxylic acid such as cyclohexanedicarboxylic acid. In the invention, esters of those compounds may be used together with or in place of the dicarboxylic acid. Among these dicarboxylic acids, terephthalic acid is particularly preferrred.

Examples of the dihydroxyl compound are ethylene glycol, diethylene glycol, triethylene glycol, polyethylene glycol, cyclohexanediol, 1,3-bis(2-hydroxyethoxy)benzene, 1,4-bis(2-hydroxyethoxy)benzene and bis(4-hydroxyethoxyphenyl)sulfone. Among these dihydroxyl compounds, ethylene glycol is particularly preferrred.

The slurry contains 1.02–2.0 molar parts, preferably 1.03–1.5 molar parts, of the dihydroxyl compound to 1 molar part of the dicarboxylic acid.

In the present invention, a monofunctional compound or a tri- or more polyfunctional compound may be used, if necessary, together with the above-mentioned dicarboxylic acid and the dihydroxyl compound. Examples of the monofunctional compound are benzoylbenzoic acid, diphenylsulfonemonocarboxylic acid, stearic acid, methoxypolyethylene glycol and phenoxypolyethylene glycol. Examples of the above-mentioned polyfunctional compound are trimesic acid, trimethylolmethane, trimethylolethane, trimethylolpropane and pentaerythritol.

Such mono- and polyfunctional compounds are contained in the above slurry within a range of 0.01–20 molar %, preferably 0.05–10 molar %, when the total amount of the dicarboxylic acid and the dihydroxyl compound is 100 molar %.

In the present invention, the esterifying reaction is carried out using a reactor having at least two esterifying devices connected in a series in a two-step manner wherein the water produced as a result of the reaction is removed from the distilling tower while the dihydroxyl compound is refluxed.

When the esterifying reaction is carried out in a two-step manner wherein the two reactors are connected in a series as mentioned above, for example, the reaction conditions are as follows. Thus, in the first step, the reaction temperature is usually within a range of 240°–270° C., preferably within a range of 245°–265° C., while the pressure is within a range of 0.2–3 kg/cm$^2$G, preferably 0.5–2 kg/cm$^2$G. In the second step, the temperature is usually within a range of 250°–280° C., preferably, 255°–275° C. while the pressure is within a range of 0–1.5 kg/cm$^2$G, preferably, 0–1.3 kg/cm$^2$G.

The esterifying reaction is preferably conducted in the presence of a small amount of a basic compound. Examples of such a basic compound are tertiary amines such as triethylamine, tri-n-butylamine and benzyldimethylamine; and quaternary ammonium hydroxides such as tetraethylammonium hydroxide, tetra-n-butylammonium hydroxide, lithium carbonate, sodium carbonate, potassium carbonate and sodium acetate. When the esterifying reaction is carried out in the presence of such a basic compound, it is possible to keep the ratio of the diethylene glycol terephthalate unit in the main chain of the resulting polyester at a relatively low level.

As a result of such an esterifying reaction, a low-level condensate wherein the number average molecular weight is usually within a range of 500–5000 is obtained.

The low-level condensate obtained in the esterifying reaction is then subjected to a polycondensing step in a liquid phase. The polycondensation in a liquid phase is carried out in the following manner. The low-level condensate obtained in the esterifying step is heated in vacuo in the presence of a polycondensation catalyst at a temperature of not lower than the melting point of the low-level condensate obtained in the esterifying step or, usually, in the range of 270°–300° C. and the resulting distillate which contains the unreacted dihydroxyl compound such as ethylene glycol is ditilled out of the reaction system. Besides the dihydroxyl compound such as ethylene glycol, the distillate contains the polycondensation catalyst, water and oligomers which will be mentioned later.

The polycondensation in the liquid phase may be carried out either in a single step or in multiple steps. For example, when the polycondensation is carried out in two steps, the polycondensation of the first step is usually carried out at 250°–290° C., preferably 260°–280° C., and 500–20 Torr, preferably 200–30 Torr, and that of the second step is usually carried out at 265°–300° C., preferably 270°–295° C., and 10–0.1 Torr, preferably 5–0.5 Torr.

Examples of the catalyst used for the polycondensation are germanium dioxide; germanium alkoxides such as germanium tetraethoxide and germanium tetra-n-butoxide; antimony compounds such as antimony trioxide; titanium alkoxides such as titanium tetrabutoxide. Among those, germanium dioxide is particularly preferred.

The liquid phase polycondensation may be carried out in the presence of a stabilizer as well. Preferred examples of the stabilizer are phosphates such as trimethyl phosphate, triethyl phosphate, tri-n-butyl phosphate, trioctylphosphate and triphenyl phosphate; phosphites such as triphenyl phosphite, tridecyl phosphite and tris (nonylphenyl)phosphite; acid phosphates such as methyl acid phosphate, isopropyl acid phosphate, butyl acid phosphte, dibutyl phosphate, monobutyl phosphate and dioctyl phosphate; and phosphorus compounds such as phosphoric acid and polyphosphoric acid.

According to the invention, it is preferred that the amount of the polycondensation catalyst used in the liquid phase polycondensing reaction on a basis of a metal in the polycondensation catalyst is usually within a range of 0.0005–0.2 molar %, preferably, 0.001–0.1 molar % to the dicarboxylic acid. With respect to the stabilizer used in the polycondensation reaction, its preferred amount to the esterified product of the dihydroxy compound and the dicarboxylic acid is usually 0.001–0.1% by weight, and preferably in the range of 0.002–0.2% by weight.

According to the invention, the polycondensation catalyst may be present only during the liquid phase polycondensation reaction. Accordingly, the catalyst may be added to the reaction system in the esterifying step or may be added to the reaction system in the liquid phase polycondensation step. As mentioned later, when the purified distillate is returned to and reused in the esterifying step, the purified distillate contains the recovered polycondensation catalyst and, therefore, the deficiency of the polycondensation catalyst may be just supplemented in the next polycondensation in the liquid phase. Alternatively, the deficient amount may be added to the system prior to the esterifying step. It goes without saying that the necessary amount of catalyst may be dividedly added in the esterifying step and also in the liquid phase polycondensation step.

When a stabilizer is used in the polycondensation, the distillate as well as the purified distillate contain the stabilizer. Accordingly, when the purified distillate is returned to the esterifying step, a stabilizer in a suitable amount may, if necessary, be added to the purified distillate.

The polyester which is prepared from the liquid phase polycondensation step as such usually exhibits an intrinsic viscosity of 0.40–1.0 dl/g, and preferably of 0.50–0.90 dl/g.

The thus prepared polyester is usually melted and molded by extrusion whereupon particles or chips are produced. Usually the polyester is further subjected to polycondensation in the solid phase. For example, the polyester chips are subjected to the solid phase polycondensation by heating at a temperature between 160° C. and the melting point and, preferably, at a temperature of 170°–220° C. for 8–40 hours, preferably for 15–30 hours. It is preferred that the resultant polyester after the solid phase polycondensation has an intrinsic viscosity of 0.60–1.00 dl/g, preferably of 0.75–0.95 dl/g.

The manufacture of the polyester including the esterifying and the polycondensing steps as above-mentioned may be carried out either by a batchwise manner or by a semicontinuous or a continuous manner.

In the manufacture of the polyester as such, the distillate from the liquid phase polycondensation step in many cases mainly comprises an unreacted dihydroxyl compound and a polycondensation catalyst and, further, water, oligomers, iron substances from the rust derived from the reactor, stabilizer, etc. Particularly, the above-mentioned unreacted dihydroxyl compound occupies about 80–95% by weight of the distillate while the insoluble oligomers separated in the distillate are usually not more than 5% by weight.

Hereinunder, the first and the second methods in accordance with the present invention will be described taking the manufacture of polyester from ethylene glycol and terephthalic acid as an example.

Figure 2:
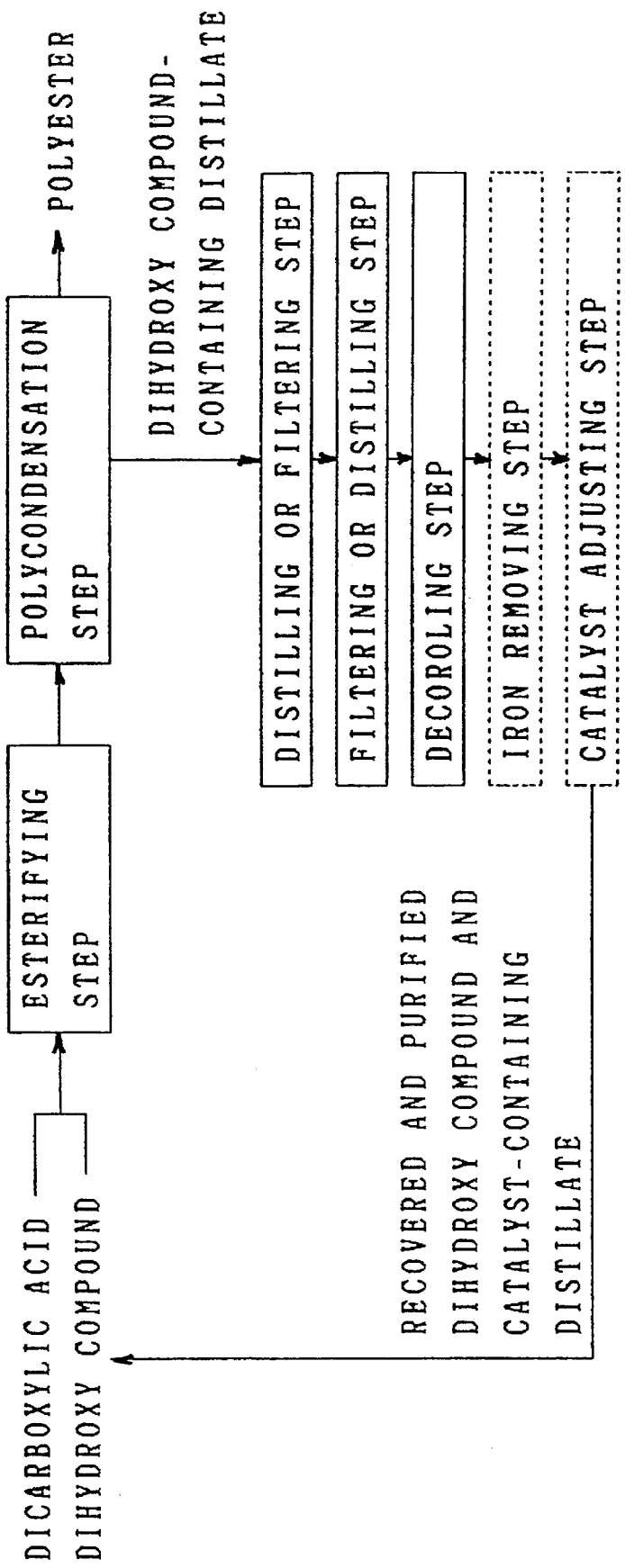
FIG. 2 is a flow sheet showing the purification and the reutilization of the distillate which is distilled from a liquid phase polycondensation step according to the present invention.

According to the first method of the invention, the distillate from the above-mentioned liquid phase polycondensation step is subjected, as shown in FIG. 2, to the purification treatment comprising (a) a distilling step, (b) a filtering step and (c) a decoloring step. It is usually preferred that the purification treatement is conducted, for example, in the following order: (a) distilling step, (b) filtering step and (c) decoloring step, or in the order of (b) filtering step, (a) distilling step and (c) decoloring step. When the purification treatment contains an iron removing step (d), it is usually conducted as the final step in the purification treatment or, after the distilling and the filtering steps, the iron-removing step is conducted followed by a decoloring step, though the invention is not limited thereto.

In the purification treatment, the distilling step removes water and low-boiling fractions contained in the distillate. The distillation is carried out preferably at a temperature of not higher than the boiling point of ethylene glycol. Accordingly, it is preferred that it is conduced at a pressure of 20–600 Torr, preferably 50–150 Torr, at a temperature of 100°–200° C., preferably of 120°–170° C.

The amount of water in the distillate following such a distilling step is preferably not more than 1.0% by weight, preferably not more than 0.5% by weight. According to the invention, the distillate is subjected to distillation treatment as such for removing water and low-boiling fractions, so that, as compared with the distillate which is not subjected to such treatment, there are advantages in that the load which affects the further decoloring and iron removing steps is reduced and the passing time becomes longer.

The filtering step is useful for removing the insoluble oligomers, etc. in the distillate. According to the invention, it is preferred that the filtering step is conducted using a filtering aid while keeping the temperature of the distillate at 10°–80° C., preferably, at 20°–60° C. The filtering aid used is preferably of celite or cellulose type substance, and it may be used in an amount of 10–200 parts by weight, preferably of 50–100 parts by weight, in relation to 100 parts by weight of the insoluble oligomers in the distillate.

It is preferred that the amount of the insoluble oligomers in the distillate after such a filtering step is not more than 0.05 parts by weight, preferably not more than 0.01% by weight. According to the invention, the distillate is filtered as such whereby the insoluble oligomers are removed and, therefore, it is possible to prevent the active carbon used for the decoloring step or the ion exchange resin used in the iron removing step from becoming clogged.

The decoloring step is a step in which the distillate is put in contact with an activated carbon so that the colored substances contained in the distillate are removed. When the distillate is put in contact with the activated carbon, the temperature is usually within a range of 50°–100° C., preferably 70°–90° C. while the superficial velocity in the column is usually within a range of 0.1–6.0 hr$^{-1}$, preferably 0.167–4.0 hr$^{-1}$, more preferably 0.20–2.0 hr$^{-1}$. In this decoloring step, it is preferred that the $T_{380}$ of the distillate following the treatment be not less than 97%, preferably not less than 98%. When the $T_{380}$ is not less than 98%, there is no deterioration in the quality, especially the hue, of the resultant polyester.

The term $T_{380}$ used here refers to the transmittance of light at the wavelength of 380 nm and can be measured as follows. Thus, the distillate after the treatment is charged in a quartz cell of 10 mm both in width and length using a spectrophotometer (type U-1100; manufactured by Hitachi) and the transmittance is measured at a wavelength of 380 nm using distilled water as a control.

As mentioned above, the distillate is placed in contact with an activated carbon in the decoloring step and, therefore, it is possible to remove the colored substances in the distillate without a substantial reduction in the amount of the polycondensation catalyst in the distillate.

The iron removing step is a step in which the iron which may be contained in the distillate is removed. Usually the iron is removed by putting the distillate in contact with an ion exchange resin. Examples of the ion exchange resin used are cationic, anionic or amphoteric ion exchange resins and, among these, the use of a cationic exchange resin, particularly, the use of a strongly-acidic cationic exchange resin is preferred.

According to the invention, it is preferred that the distillate is placed contact with an ion exchange resin at a temperature of 50°–100° C., preferably of 70°–90° C. with a superficial velocity in a column of 0.1–6.0 $hr^{-1}$, preferably 0.167–4.0 $hr^{-1}$, and more preferably 0.20–2.0 $hr^{-1}$.

Preferably, after such an iron removing step, the distillate contains not more than 2 ppm, more preferably not more than 0.5 ppm, of iron. When the iron in the distillate is removed in the iron removing step, the hue of the resulting polyester is no longer deteriorated.

The distillate which is purified as mentioned above is recovered as a dihydroxyl compound containing the polycondensation catalyst and is recycled in the hereinbefore mentioned esterifying step.

Figure 3:
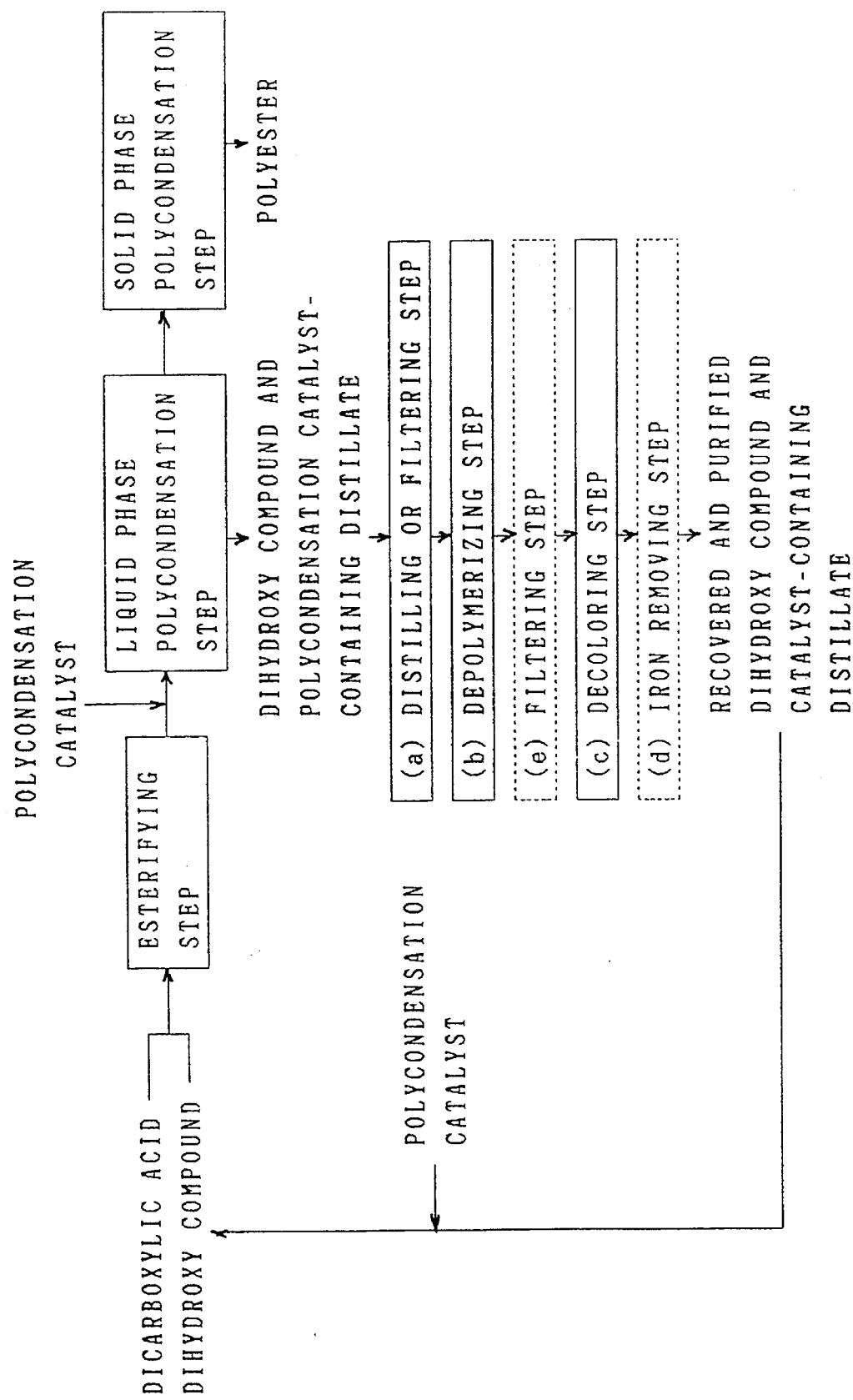
FIG. 3 is a flow sheet showing the purification and the reutilization of the distillate which is distilled from a liquid phase polycondensation step according to another embodiment of the present invention.

Hereinunder, the second method of the invention is described. According to the second method of the invention, the distillate from the liquid phase polycondensation step is subjected, as shown in FIG. 3, to (a) a distilling step, (b) a depolymerizing step and (c) a decoloring step. Usually this purification treatment is preferably carried out in the following order: (a) a distilling step, (b) a filtering step and (c) a decoloring step. If, however, the purification treatment includes an iron removing step (d), the step is preferably conducted as the final step of the purification treatment. Further, if the purification treatment includes a filtering step (e), then it is preferred that this step is conducted after the depolymerizing step (b) and followed by the decoloring step (c).

The distilling step is the same as that mentioned already.

The depolymerizing step is a step in which the oligomers in the distillate are depolymerized. The distillate from the liquid phase polycondensation step contains oligomers such as cyclic trimers of ethylene glycol with terephthalic acid and bis-β-hydroxyethyl ether or low polymers thereof and most of the insoluble oligomers in the distillate are the above-mentioned cyclic trimers.

The depolymerizing step is carried out by heating the insoluble matters such as the cyclic trimers in the presence of an excessive ethylene glycol whereby they are depolymerized into compounds which are soluble in the distillate such as bis(hydroxyethyl)terephthalate.

According to the invention, the depolymerizing step is carried out by keeping the distillate in vacuo or under either atmospheric or high pressure at a temperature within the range of 100°–180° C., preferably 130°–170° C., for from 10 minutes to 5 hours, preferably from 30 minutes to 4 hours, more preferably for 1–4 hours.

The depolymerizing step may also be carried out using a distilling tower having such a bottom volume as the residence time is from 10 minutes to 5 hours, preferably 30 minutes to 4 hours, more preferably 1–4 hours, at a temperature range of 100°–180° C., preferably 130°–170° C., when the distillation step is conducted using a distilling tower.

According to the invention, it is possible in the depolymerizing step to make the amount of the insoluble oligomers in the distillate to be not more than 0.2% by weight, preferably not more than 0.1% by weight, more preferably not more than 0.05% by weight. The distillate obtained after such a depolymerizing step, i.e. the depolymerized solution, contains a small amount of oligomers, particularly insoluble oligomers, and so the filtering step in the purification treatment of the distillate may be omitted. Even when no filtering step is conducted and the decoloring step (b) and the iron removing step (d) there-after are conducted, those step can be carried out without clogging the activated carbon or the ion exchange resin used therefor.

Nevertheless, the filtering step (e) may be carried out in the purification treatment of the distillate. It is preferred that the filtering step is carried out after the above-mentioned depolymerizing step. Usually, filtration is conducted at the temperature within a range of 50°–100° C.

When the filtering step is carried out after the depolymerizing step as such, there are disadvantages that the use of large size filtering devices such as a pressure filter and a vacuum filter is not necessary, but the commonly used simple devices such as a cartridge filter or a strainer may be used for filtering the insoluble oligomers to remove them from the distillate and further that the life of such devices can be prolonged.

The decoloring and the iron removing steps are the same as those which have been already illustrated.

As set forth above, in any of the first and the second methods of the present invention, the distillate from the liquid phase polycondensation step is purified and recovered. It is usually preferred that the purified substances thus recovered from the distillate contain 96.0–98.5% by weight, preferably 96.5–99.0% by weight, of ethylene glycol and not more than 0.5% by weight of water.

Thus, in any of the first and the second methods according to the invention, the distillate from the liquid phase polycondensation step is purified, recovered and reutilized by recycling it to the esterifying step.

Usually, the polycondensation catalyst and the stabilizer used in the manufacture of the polyester are in part consumed by incorporating into the resulting polyester and thus are lost from the reaction system. Accordingly, it is preferred in the present invention that the polycondensation catalyst and the stabilizer are added to the purified and recovered distillate in amounts which correspond to those lost from the reaction system so that certain amounts of the polycondensation catalyst and the stabilizer are contained in the liquid phasepolycondensation reaction system.

As set forth above, the distillate which is distilled from the liquid phase polycondensation is purified and the recovered dihydroxyl compound and the polycondensation catalyst as such are supplied to the esterifying step at least as a part of the material and of the catalyst. Accordingly, the polycondensation catalyst and the dihydroxyl compound distilled from the polycondensation step can be effectively reutilized. However, the rate at which of the polyester is produced is not lowered and also the quality of the resulting polyester is not deteriorated.

In accordance with the invention, the distillate which is distilled from the liquid phase polycondensation step and mainly composed of the dihydroxyl compound accompanied by the polycondensation catalyst is purified, recovered and recycled for reutilization to the polycondensation step to produce the polyester. Therefore, the production cost can be reduced and, in addition, the quality of the resulting polyester as such is not lowered but is nearly the same as that of polyesters obtained by the conventional methods.

EXAMPLES

The present invention will be further illustrated by way of the following examples though the present invention is not limited thereto.

First, examples which relate to the first method of the invention are given below.

EXAMPLE 1

An esterifying reaction of 100 parts of terephthalic acid with 44.8 parts by weight of ethylene glycol was conducted in the presence of 0.019 parts by weight of germanium dioxide at a temperature of 260° C. and a pressure of 1.7 kg/cm$^2$G. To the esterified product thus obtained were added 0.029 parts by weight of trimethyl phosphate and a liquid phase polycondensation was carried out for three hours at a temperature of 275° C. and a pressure of 3 Torr to yield a polyester during which a distillate comprising 87.1% by weight of ethylene glycol, 0.6% by weight of diethylene glycol, 12.0% by weight of water and 0.3% by weight of insoluble oligomers was obtained from the polycondensation step.

The distillate was distilled at a temperature of 137° C. and a pressure of 80 Torr and 0.3 parts by weight of a filter aid of a cellulose type (KS-100 manufactured by Kojin) was added to the resulting residue after the distillation followed by dispersing it while stirring. Then it was filtered through a membrane filter (0.45 μm) to give a clear filtrate with a $T_{380}$ of 93.7%. Upon observation with the naked eye, no floating matter was detected.

Thereafter, the filtrate was heated at 70° C. and the iron removing treatment and the decoloring treatment were conducted in this order at a superficial velocity of 0.5 hr$^{-1}$ in a column. In the iron removing treatment, a strongly-acidic cationic exchange resin (Amberlist 15 WET manufactured by Organo) was used while, in the decoloring treatment, an activated carbon (Kuraray Coal GLC manufactured by Kuraray Chemical) was used.

The distillate purified as such had a composition of 98.4% by weight of ethylene glycol, 0.9% by weight of diethylene glycol, 0.5% by weight of water, 0.0002% by weight of iron and 0.2% by weight of germanium and had $T_{380}$ of 99.5%.

Then the purified distillate prepared as such was used as a part of the material and of the polycondensation catalyst to manufacture the polyester. Thus, an esterifying reaction was conducted by conventional means using 100 parts by weight of terephthalic acid, 38.2 parts by weight of ethylene glycol, 6.7 parts by weight of the above-mentioned purified distillate and 0.019 parts by weight of germanium (calculated as germanium dioxide; the germanium was that which was present in the above-mentioned distillate) and then a liquid phase polycondensation was conducted after adding 0.029 parts by weight of trimethyl phosphate to give polyester chips with an instrinsic viscosity of 0.56 dl/g.

The resulting polyester chips were subjected to a solid phase polycondensation at 215° C. for 21 hours in an inactive atmosphere, e.g., nitrogen atmosphere, to give polyester chips with an intrinsic viscosity of 0.80 dl/g.

The polyester chips were subjected to a measurement using a color difference meter of a 45° diffusion type (type SC-2-CH; manufactured by Suga Shikenki) whereupon the color tone was as follows. Thus an L value (lightness) of 90.4; an a value (+: red; −: green) of −2; and a b value (+: yellow; −: blue) of +4.2.

The chips were heated to melt at 275° C. and formed into a corrugated square board having a thickness of 5 mm with an injection molding machine. The board was found to have a haze of 6.6%.

EXAMPLE 2

The purified distillate prepared in Example 1 was used as a part of the material and of the polycondensation catalyst to manufacture the polyester. Thus, an esterifying reaction was conducted using 100 parts by weight of terephthalic acid, 31.4 parts by weight of ethylene glycol, 13.5 parts by weight of the purified distillate and 0.038 parts by weight (calculated as germanium dioxide) of germanium (that which was present in the above-mentioned purified distillate) in the same manner as in Example 1 and then a liquid phase polycondensation was conducted after adding 0.029 parts by weight of trimethyl phosphate thereto to give polyester chips with an intrinsic viscosity of 0.56 dl/g. The polyester chips were then subjected to solid phase polycondensation at 215° C. in a nitrogen stream for 18 hours to give polyester chips with an intrinsic viscosity of 0.80 d/g.

The color tone of the polyester chips had an L value of 91.7: an a value of −2.6; and a b value of +3.8.

The chips were formed into a corrugated square board having a thickness of 5 mm in the same manner as in Example 1. The board was found to have a haze of 10.5%.

EXAMPLE 3

The distillate was purified in the same manner as in Example 1 with the exception that the distillate from the liquid phase polycondensation was not subjected to an iron removing treatment. The purified distillate prepared as such had a composition of 98.6% by weight of ethylene glycol, 0.8% by weight of diethylene glycol, 0.4% by weight of water, 0.0014% by weight of iron and 0.2% by weight of germanium and had $T_{380}$ of 99.1%.

Polyester chips with an intrinsic viscosity of 0.56 dl/g was prepared in the same manner as in Example 1 using the purified distillate. The polyester chips were then subjected to solid phase polycondensation in the same manner as in Example 1 to give polyester chips with an intrinsic viscosity of 0.78 dl/g.

The color tone of the polyester chips had an L value of 90.7, an a value of −2.3 and a b value of +3.6.

The chips were formed into a corrugated square board having a thickness of 5 mm in the same manner as in Example 1. The board was found to have a haze of 10.2%.

EXAMPLE 4

The distillate was purified in the same manner as in Example 1 with an exception that the the distillate from the polycondensation was subjected to the distilling, filtering, decoloring and iron removing steps in this order. The thus purified distillate had a composition of 96.9% by weight of ethylene glycol, 0.8% by weight of diethylene glycol, 2.1% by weight of water, 0.0004% by weight of iron and 0.2% by weight of germanium and had $T_{380}$ of 99.4%.

Polyester chips with an intrinsic viscosity of 0.55 dl/g were prepared by use of the purified distillate in the same manner as in Example 1. The polyester chips were further subjected to a solid phase polymerization in a nitrogen stream at 215° C. for 18 hours to give polyester chips with an intrinsic viscosity of 0.77 dl/g.

The color tone of the polyester chips had an L value of 91.1; an a value of −2.7; and a b value of +3.6.

The chips were formed into a corrugated square board having a thickness of 5 mm in the same manner as in Example 1. The board was found to have a haze of 9.9%.

REFERENCE EXAMPLE 1

The same process as that employed in Example 1 was conducted for the manufacture of the polyester with the exception that 0.019 parts by weight of germanium dioxide was used in place of 6.7 parts by weight of ethylene glycol to give polyester chips with an intrinsic viscosity of 0.56 dl/g. The polyester chips were further subjected to a solid phase polymerization in the same manner as in Example 1 to give polyester chips with an intrinsic viscosity of 0.80 dl/g.

The color tone of the polyester chips had an L value of 91.0; an a value of −2.5; and a b value of +3.5.

The chips were formed into a corrugated square board with a thickness of 5 mm. The haze of the board was 10.6%.

REFERENCE EXAMPLE 2

The same operations as in Example 2 were carried out in the manufacture of the polyester with an exception that 13.5 parts by weight of ethylene glycol and 0.038 parts by weight of germanium dioxide were used in place of a purified distillate to give polyester chips with an intrinsic viscosity of 0.56 dl/g. The polyester chips were subjected to solid phase polymerization in the same manner as in Example 2 to give polyester chips with an intrinsic viscosity of 0.80 dl/g.

The color tone of the polyester chips had an L value of 91.3; an a value of −2.6 and a b value of +3.4.

The chips were formed into a corrugated square board with a thickness of 5 mm in the same manner as in Example 1. The board was found to have a haze of 10.5%.

COMPARATIVE EXAMPLE 1

The distillate from the polycondensation step was purified in the same manner as in Example 1 with the exception that the iron removing and the decoloring steps were not conducted. The purified distillate prepared as such had a composition of 98.5% by weight of ethylene glycol, 0.9% by weight of diethylene glycol, 0.4% by weight of water, 0.0010% by weight of iron and 0.2% by weight of germanium and had $T_{380}$ of 92.5%.

Polyester chips with an intrinsic viscosity of 0.44 dl/g were prepared by use of the thus purified distillate in the same manner as in Example 1. The polyester chips were further subjected to solid phase polymerization in a nitrogen stream at 215° C. for 25 hours to give polyester chips with an intrinsic viscosity of 0.8 2 dl/g.

The color tone had an L value of 91.0; an a value of −2.2; and a b value of +3.9 and was slightly yellow.

The chips were made into a corrugated square board with a thickness of 5 mm in the same manner as in Example 1. The haze was 17.5% and the board was slightly hazy.

COMPARATIVE EXAMPLE 2

A polyester was prepared in the same manner as in Example 1 by means of esterification and polycondensation using terephthalic acid and ethylene glycol as the materials during which polycondensation step a distillate was obtained which was composed of 81.5% by weight of ethylene glycol, 2.3% by weight of diethylene glycol, 15.9% by weight of water and 0.3% by weight of insoluble oligomers.

The distillate was allowed to stand to remove the insoluble oligomers in the distillate. Thereafter the distillate was put in contact with a strongly-acidic cationic exchange resin (Amberlist 15WET manufactured by Organo) at the superficial velocity of 1.0 $hr^{-1}$ in a column at ambient temperature to remove the iron, then distilled at atmospheric prssure and a temperature of 175° C. and the resulting residue after the distillation was decolorized with an activated carbon (Cargon CPG manufactured by Toyo Cargon) to purify the distillate.

The thus purified distillate had a composition of 94.5% by weight of ethylene glycol, 2.9% by weight of diethylene glycol, 2.6% by weight of water, 0.0001% by weight of iron and 0.032% by weight of germanium and had $T_{380}$ of 95.0%.

The purified distillate prepared as such was used as a part of the materials and the polycondensation catalyst to manufacture the polyester. Thus an esterification reaction was conducted in conventional manner using 100 parts by weight of terephthalic acid, 34.7 parts by weight of ethylene glycol, 10.8 parts by weight of the above prepared purified distillate and 0.0013 parts by weight of germanium dioxide and then liquid phase polycondensation was conducted after adding 0.017 parts by weight of trimethyl phosphate to give polyester chips with an intrinsic viscosity of 0.59 dl/g. Then the polyester chips were subjected to solid phase polymerization in a nitrogen stream at 215° C. for 13 hours to give polyester chips with an intrinsic viscosity of 0.78 dl/g.

The color tone of the polyester chips had an L value of 88.0; an a value of −1.8; and a b value of +4.6.

A corrugated square board with a thickness of 5 mm was prepared from the chips in the same manner as in Example 1, and was found to have a haze of 4.2%.

As hereinunder, the examples for the second method of the present invention will be given.

EXAMPLE 5

The esterifying reaction of 100 parts by weight of terephthalic acid with 44.8 parts by weight of ethylene glycol was conducted in the presence of 0.019 parts by weight of germanium dioxide at the temperature of 260 ° C. and at the pressure of 1.7 kg/cm²G. an amount of 0.029 parts by weight of trimethyl phosphate was added to the resulting esterified product and the mixture was then subjected to liquid phase polycondensation at a temperature of 275° C. and at a pressure of 3 Torr for three hours to provide a polyester during which polycondensation step, a distillate was obtained which had a composition of 87.1% by weight of ethylene glycol, 0.6% by weight of diethylene glycol, 12.0% by weight of water and 0.3% by weight of insoluble oligomers.

The distillate was distilled at a temperature of 150° C. and a pressure of 80 Torr to remove water and the low-boiling components. Then the residue after distillation was stirred at 150° C. for two hours to conduct depolymerization and the insoluble oligomers were filtered through a membrane filter (3.0 μm) at 80° C. The amount of the insoluble oligomers which were filtered was 0.002% by weight of the above-mentioned residue after distillation.

The time required to filter the above depolymerized distillate in an amount of 300 ml at 80° C. through a filter having a filtering area of 9.6 cm² (3.0 μm) was 3.5 minutes. The time needed to filter ethylene glycol under the same conditions was 3.5 minutues as well. Thus, the depolymerized distillate had the same filtering ability as that of ethylene glycol.

The resulting filtrate was transparent and was found to have a $T_{380}$ value of 93.7%. No floating matter was detected in the filtrate when observed with the naked eye.

After that, the filtrate kept at 80° C. was put in contact with an activated carbon (Cargon APA; manufactured by Toyo Cargon) at the superficial velocity of 0.5 $hr^{-1}$ in a column to decolorize it and, while still keeping it at 80° C., it was further put in contact with a strongly acidic cationic exchange resin (Amberlist 15 WET; manufactured by Organo) at a superficial velocity of 0.5 $hr^{-1}$ in a column to remove the iron.

The purified distillate prepared as such had a composition of 98.1% by weight of ethylene glycol, 0.9% by weight of diethylene glycol, 0.8% by weight of water, 0.00005% by weight of iron and 0.23% by weight of germanium and was found to have $T_{380}$ of 98.90%.

Then a polyester was prepared using the purified distillate as a part of the materials and the polycondensation catalyst. Thus an esterification reaction was conducted using 100 parts by weight of terephthalic acid, 39.6 parts by weight of ethylene glycol and 5.2 parts by weight of the purified distillate (containing 5.1 parts by weight of ethylene glycol and 0.017 parts by weight of germanium calculated as germanium dioxide).

The resultant esterified product was subjected to liquid phase polycondensation under the same conditions as mentioned already to give polyester chips with an intrinsic viscosity of 0.55 dl/g.

Then the polyester chips were subjected to solid phase polycondensation in a nitrogen stream at 215° C. for 21 hours to give polyester chips with an intrinsic viscosity of 0.76 dl/g.

The polyester chips were measured using a color difference meter of a 45° diffusion type (type SC-21-CH; manufactured by Suga Shikenki). The color tone had an L value of 91.0; an a value of −2.2; and a b value of +1.6.

The polyester chips were heated to melt at 275° C. to give a corrugated square board having a thickness of 5 mm with an injection molding machine. The board was found to have a haze of 6.1%.

REFERENCE EXAMPLE 3

In the manufacture of the first polyester described in Example 5, the intrinsic viscosity of the polyester chips obtained by liquid phase polycondensation was 0.55 dl/g. The polyester chips were subjected to solid phase polycondensation in the same manner as in Example 5 to give polyester chips with an intrinsic viscosity of 0.78 dl/g.

The color tone of the polyester chips had an L value of 90.9: an a value of −2.4; and a b value of +1.6.

A corrugated square board with a thickness of 5 mm was prepared from the polyester chips, and was found to have a haze of 4.5%.

COMPARATIVE EXAMPLE 3

The distillate obtained from the polycondensation step in Example 5 was not purified but reused as it was for the manufacture of a polyester. Thus, an esterification reaction was conducted in the same manner as in Example 5 using 100 parts by weight of terephthalic acid, 38.2 parts by weight of ethylene glycol and 6.7 parts by weight of the above-mentioned unpurified distillate (containing 5.84 parts by weight of ethylene glycol and 0.019 parts by weight of germanium calculated as germanium dioxide) and then subjected to liquid phase polycondensation to provide polyester chips with an intrinsic viscosity of 0.55 dl/g.

Then the polyester chips were subjected to solid phase polycondensation in a nitrogen stream at 215° C. for 18 hours to provide polyester chips with an intrinsic viscosity of 0.75 dl /g.

The color tone of the resulting polyester chips had an L value of 90.6; an a value of −2.6; and a b value of +2.7 and the chips were slightly yellow.

A corrugated square board with a thickness of 5 mm was prepared from the polyester chips in the same manner as in Example 5, and was fouund to have a haze of 15.2%.

COMPARATIVE EXAMPLE 4

The distillate obtained in Example 5 was distilled at a temperature of 150° C. and at a pressure of 80 Torr to remove water and the low-boiling components.

The resulting residue in an amount of 300 ml after the distillation was filtered through a filter with a filtering area of 9.6 cm² (3.0 μm) at 25° C. whereupon the time required for the filtration was 105 minutes. The time required for filtering ethyelne glycol under the same condition was 4.5 minutes.

Then the residue after the above mentioned distillation was cooled to 25° C. to separate insoluble oligomers therefrom and then the insoluble oligomers were filtered at 25° C. using a membrane filter (3.0 μm). The insoluble oligomers filtered as such was 0. 30% by weight of the above mentioned residue after the distillation.

The filtrate was clear with a $T_{380}$ value of 94.0%. No floating matter was detected in the filtrate when observed with the naked eye.

The filtrate was then heated at 80° C. and subjected to decoloring and iron removing treatment in the same manner as in Example 5.

The thus purified distillate had a composition of 98.6% by weight of ethylene glycol, 0.9% by weight of diethylene glycol, 0.5% by weight of water, 0.0002% by weight of iron and 0.20 % by weight of germanium and was found to have a $T_{380}$ value of 99.5%.

Then polyester was manufactured using the purified distillate as a part of the materials and of the polycondensation catalyst. Thus, an esterifying reaction was carried out using 100 parts by weight of terephthalic acid, 38.2 parts by weight of ethylene glycol and 6.7 parts by weight of the above mentioned purified distillate (containing 6.6 parts by weight of ethylene glycol and 0.019 parts by weight of germanium calculated as germanium dioxide).

The resulting esterified product was subjected to liquid phase polycondensation under the same conditions as in Example 5 to give polyester chips having an intrinsic viscosity of 0.56 dl /g.

Then the polyester chips were subjected to solid phase polycondensation at 215° C. for 21 hours to give polyester chips having an intrinsic viscosity of 0.80 dl/g.

The color tone of the polyester chips had an L value of 90.4; an a value of −2.5; and a b value of +1.6 and was slightly yellowish.

A corrugated square board with a thickness of 5 mm was prepared from the polyester chips, and was found to have a haze of 6.6%.

REFERENCE EXAMPLE 4

The distillate obtained in Example 5 was subjected to a batchwise distillation at a temperature of 135° C. and a pressure of 80 Torr for 2.5 hours to remove water and the low-boiling components.

The distillate which was subjected to distillation as such was filtered through a membrane filter (0.45 μm) whereupon the $T_{380}$ of the filtrate was 88.1%.

The distillate which was distilled in such a manner was heated at 15° C. for two hours, cooled to 25° C. and filtered through a membrane filter (0.45 μm). The resulting filtrate had a $T_{380}$ value of 88.0% and there was no change in the $T_{380}$ value as a result of the above mentioned heat treatment.

REFERENCE EXAMPLE 5

The distillate obtained in Example 5 was filtered through a membrane filter (3 μm). The resulting filtrate was heated at 70° C. and decolorized by putting it in contact with an active carbon (Kurary Coal GLC; manufactured by Kuraray Chemical) at a superficial velocity of 20 hr$^{-1}$ in a column. The $T_{380}$ value of the filtrate after such a treatment with the active carbon was 98.2%.

What we claim is:

1. A method of manufacturing a polyester which comprises an esterifying step wherein a dicarboxylic acid and a dihydroxyl compound are esterified and a liquid phase polycondensation step wherein the resulting ester is subjected to liquid phase polycondensation in the presence of a polycondensation catalyst while a distillate which contains an unreacted dihydroxyl compound and the polycondensation catalyst is distilled during the polycondensation reaction, wherein the distillate is subjected to a purification treatment comprising:

(a) a distilling step;

(b) a filtering step; and (c) a decoloring step and then the thus purified distillate is recovered and supplied to the esterifying step.

2. A method of manufacturing a polyester according to claim 1 in which the purification treatment further comprises an iron removing step.

3. A method of manufacturing a polyester according to claim 1 in which the distillate obtained from the liquid phase polycondensation is distilled at a temperature of 100°–200° C. and a pressure of 20–600 Torr in the distilling step wherein the resultant distillate contains not more than 1.0% by weight of water.

4. A method of manufacturing a polyester according to claim 1 in which the distillate obtained from the liquid phase polycondensation is filtered at a temperature of 10°–80° C. wherein the resultant filtrate contains not more than 0.05% by weight of insoluble oligomers.

5. A method of manufacturing a polyester according to claim 1 in which, following the distilling and filtering steps, the distillate obtained from the liquid phase polycondensation is put in contact with an activated carbon at a temperature of 50°–100° C. and a superficial velocity of 0.1–6.0 hr$^{-1}$ in a column to decolorize it wherein the thus decolored distillate has a transmittance of light at a wavelength of 380 nm ($T_{380}$) of not less than 97%.

6. A method of manufacturing a polyester according to claim 1 in which, following the distilling, the filtering and the decoloring steps, the distillate obtained from the liquid phase polycondensation is put in contact with an ion exchange resin to remove iron to an extent of not more than 2 ppm.

7. A method of manufacturing a polyester according to claim 1 or 2 in which a catalyst for polycondensation is added to the purified distillate to adjust the amount of the catalyst in the esterifying step.

8. A method of manufacturing a polyester which comprises an esterifying step wherein a dicarboxylic acid and a dihydroxyl compound are esterified and a liquid phase polycondensation step wherein the resulting ester is subjected to liquid phase polycondensation in the presence of a polycandensation catalyst while a distillate which contains an unreacted dihydroxyl compound and the polycondensation catalyst is distilled, wherein the distillate is subjected to a purification treatment comprising:

(a) a distilling step;

(b) a depolymerizing step; and (c) a decoloring step and then the purified distillate is recovered and supplied to the esterifying step.

9. A method of manufacturing a polyester according to claim 8 in which the purification treatment further comprises an iron removing step (d).

10. A method of manufacturing a polyester according to claim 8 or 9 in which the purification treatment further comprises a filtering step (e) between the depolymerizing and the decoloring steps.

11. A method of manufacturing a polyester according to claim 8 in which the distillate from the liquid phase polycondensation is distilled at a temperature of 100°–200° C. and a pressure of 20–600 Torr wherein the resultant distillate contains water in an amount of not more than 1.0% by weight.

12. A method of manufacturing a polyester according to claim 8 or 9 in which the distillate obtained from the liquid phase polycondensation is heated at a temperature of 100°–180° C. for 10 minutes to five hours to depolymerize the oligomers in the distillate in the depolymerizing step wherein the resultant distillate contains insoluble oligomers in an amount of not more than 0.2% by weight based on the resulting filtrate.

13. A method of manufacturing a polyester according to claim 12 in which the depolymerization of the distillate is conducted at the bottom of a distilling tower in the distillation of the distillate using a distilling tower.

14. A method of manufacturing a polyester according to claim 8 in which, after the distilling and depolymerizing steps, the distillate obtained from the liquid phase polycondensation is put in contact with an active carbon at a temperature of 50°–100° C. and a superficial velocity of 0.1–6.0 hr$^{-1}$ in a column wherein the thus decolored distillate has a transmittance of the light at the wavelength of 380 nm ($T_{380}$) is not less than 97%.

15. A method of manufacturing a polyester according to claim 1 in which, following the distilling, depolymerizing and decoloring steps, the distillate obtained from the liquid phase polycondensation is put in contact with an ion exchange resin wherein the iron is removed to make its content not more than 2 ppm.

16. A method of manufacturing a polyester according to claim 10 in which the distillate obtained from the liquid phase polycondensation is filtered at a temperature of 50°–100° C.

17. A method of manufacturing a polyester according to claim 8 in which a catalyst for polycondensation is added to the purified substances from the recovered distillate to adjust the amount of the catalyst in the esterifying step.

18. A method of manufacturing a polyester according to claim 10 in which the distillate obtained from the liquid phase polycondensation is heated at a temperature of 100°–180° C. for 10 minutes to five hours to depolymerize the oligomers in the distillate in the depolymerizing step wherein the resultant distillate contains insoluble oligomers in an amount of not more than 0.2% by weight based on the resulting filtrate.

19. A method of manufacturing a polyester according to claim 18 in which the depolymerization of the distillate is conducted at the bottom of a distilling tower in the distillation of the distillate using a distilling tower.

* * * * *